May 31, 1927.
G. W. LEWIS
VULCANIZER
Original Filed Nov. 4, 1925   3 Sheets-Sheet 1
1,631,042
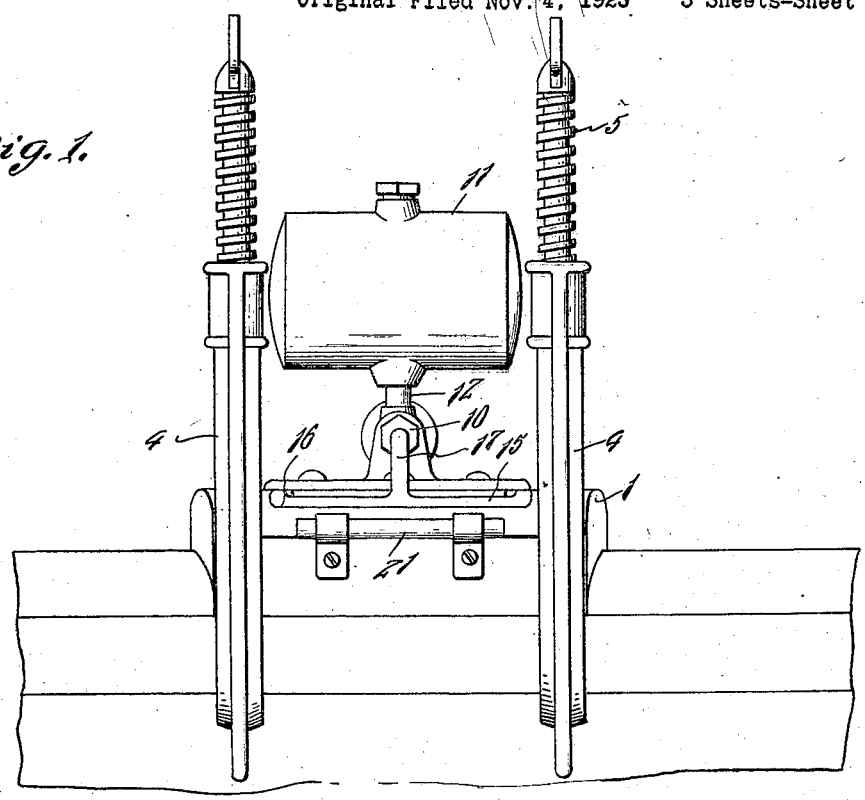
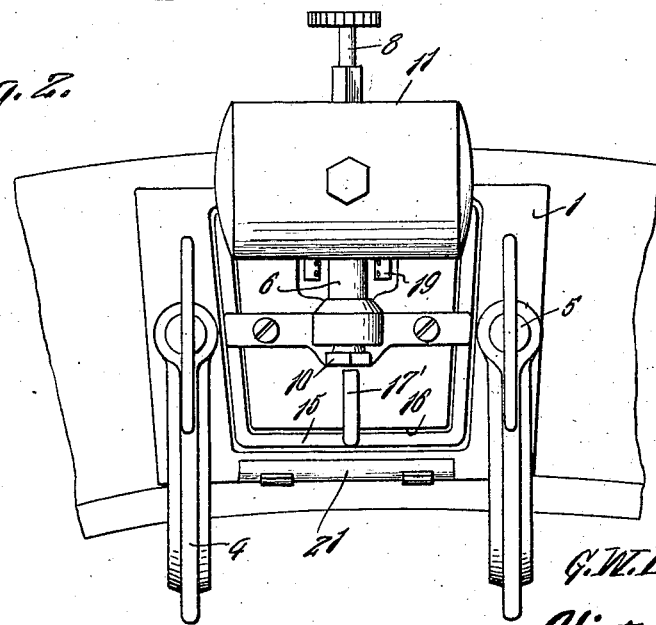

May 31, 1927.

G. W. LEWIS

VULCANIZER

Original Filed Nov. 4, 1925    3 Sheets-Sheet 2

1,631,042

G. W. Lewis
INVENTOR

BY Victor J. Evans
ATTORNEY

May 31, 1927.
G. W. LEWIS
VULCANIZER
Original Filed Nov. 4, 1925   3 Sheets-Sheet 3
1,631,042
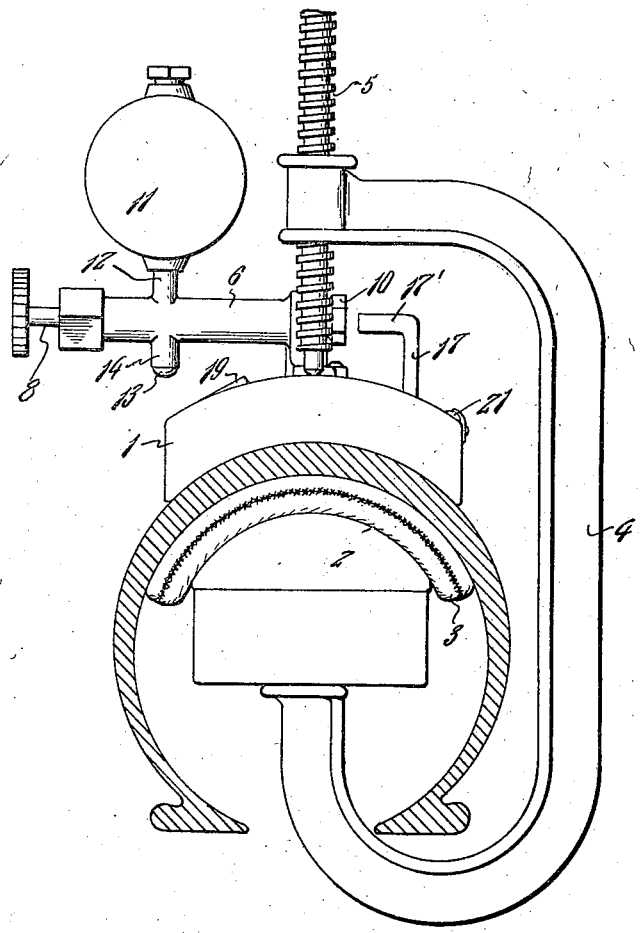
Fig. 7.
Fig. 6.
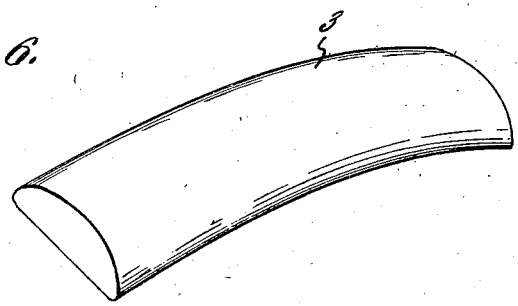
G. W. Lewis
INVENTOR
BY Victor J. Evans
ATTORNEY Patented May 31, 1927.

1,631,042

UNITED STATES PATENT OFFICE.

GEORGE W. LEWIS, OF OILTON, OKLAHOMA.

VULCANIZER.

Application filed November 4, 1925, Serial No. 66,803. Renewed April 13, 1927.

This invention relates to a vulcanizer, the general object of the invention being to provide a device whereby small cuts, tears, blow-outs and the like in a tire can be easily and quickly repaired without taking the tire to a repair shop.

Another object of the invention is to provide a gasoline burner for heating the device, means whereby the heat from the parts will cause the gasoline to expand and thus furnish the pressure necessary to give the blow torch action to the device.

A further object of the invention is to provide a pad of yieldable material for insuring the proper fit of the device on a tire.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation showing the invention in use.

Figure 2 is a plan view of Figure 1.

Figure 6 is a view of the pad

Figure 7 is a side view, showing the device in use to repair the tread part of a tire.

Figure 3:
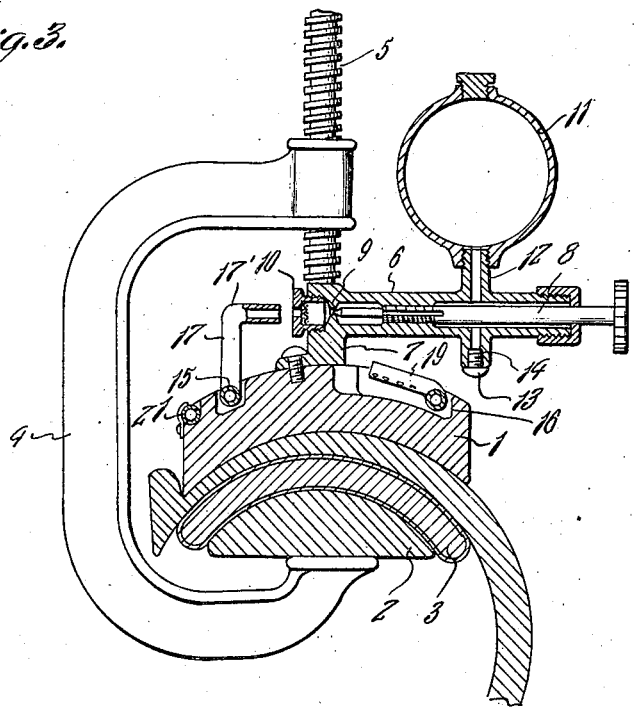
Figure 3 is a sectional view through Figure 1.
Figure 4:
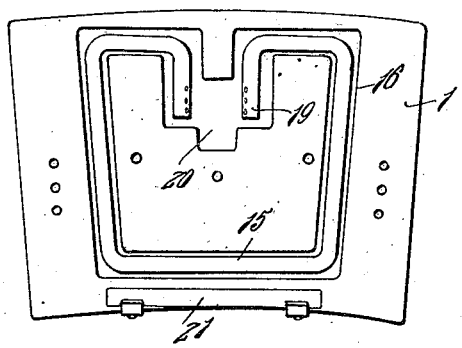
Figure 4 is a plan view of the base member.
Figure 5:
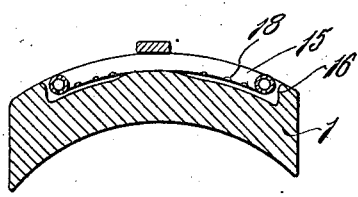
Figure 5 is a sectional view through such member.

In these views, 1 indicates a base part which is shaped to engage an outer portion of a tire and 2 indicates a convex part which is adapted to be placed within a tire so as to hold a pad 3 against a part of the inner wall of a tire. The parts are held in position by the clamps 4, one portion of each of which engages the member 2 and the end of the screw 5 of each clamp engages the base 1. Thus the parts are pressed together to clamp a part of the tire between the base 1 and the pad 3. This pad is preferably formed of a sack of any desired material and a filling of sand.

A tubular member 6 has its base part 7 fastened to the base 1 by screws or the like and a needle valve 8 is arranged in said member with its point adapted to engage a valve seat 9 formed adjacent the extremity of said member. A nozzle 10 is threaded in an opening formed in the end of the member adjacent the valve seat 9. A fuel tank 11 is connected with an upwardly extending nipple 12 on the member 6 and a plug 13 is screwed into a drain nipple 14 formed in said member. A burner loop 15 is arranged in a groove 16 formed in the top of the base, this loop having an upwardly extending part 17 thereon with its upper end bent at right angles, as shown at 17′ with its open extremity opposite the nozzle so that the fluid passing from the nozzle will enter this part 17′ and thus be caused to pass through the loop. This loop is provided with the perforations 18 which direct the flames downwardly against the base to heat the same and its ends 19 extend inwardly parallel with each other and lie in a recess 20 with which the groove 16 communicates. This recess is arranged under the inner portion of the tubular member 6, so that when gasoline or the like is poured in the recess and ignited, the member 6 will be heated and the gasoline therein will be vaporized. The flames escaping from the perforations in the portions 19 of the burner loop will also act to heat said member 6 when the device is in operation.

A thermometer 21 is arranged on the base 1 to indicate the heat of the same.

After the device is placed on a tire, as shown in the drawings, gasoline or the like is poured into the recess 20 and ignited to vaporize the gasoline in the tube 6 which, of course, fills the same from the tank 11. When the device is sufficiently heated, the needle valve is opened so that the vapor will escape from the nozzle and enter the burner loop through the extension 17 and thus burning vapor escaping through the perforations in the burner will highly heat the base 1 and thus cause the same to vulcanize the patches or fillings on the tire. The heat imparted to the gasoline in the tank 11 will cause the same to expand and thus place the same under pressure, so that the vapor will flow from the nozzle under considerable pressure. Of course, if the vapor escaping from the burner perforations fails to ignite from the fuel burning in recess 20 for the exhausting of such fuel, the vapor can be ignited by a match.

From the foregoing, it will be seen that I have provided a simple and inexpensive device, whereby small cuts, blow-outs and the like can be repaired in a tire without taking the tire to a repair shop.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A vulcanizer comprising a base having a groove and a recess therein, a burner tube in the groove with its ends bent and resting in the recess, said recess acting as an initial heating means, a nozzle carrying member supported on the base above the recess, an extension on the burner tube for receiving the vapor from the nozzle and means for supplying fuel to the nozzle carrying member.

2. A vulcanizer comprising a base having a groove and a recess therein, a burner tube in the groove with its ends bent and resting in the recess, said recess acting as an initial heating means, a nozzle carrying member supported on the base above the recess, an extension on the burner tube for receiving the vapor from the nozzle, means for supplying fuel to the nozzle carrying member, a member cooperating with the base for clamping the article to be vulcanized between them, and clamping means engaging the base and the last mentioned member for holding these parts in clamping position.

3. A vulcanizer, comprising a base having a groove and a recess therein, a tubular member supported from the base, a fuel tank connected with the member, a needle valve in said member, a nozzle at the end of the member, a burner tube in the groove in the base with its ends bent and resting in the recess, said recess acting as an initial heating means for the tubular member, the bent ends of the burner tube continuing the heating action of said member, an extension on the burner tube arranged to receive the vapor from the nozzle.

4. A vulcanizer, comprising a base having a groove and a recess therein, a tubular member supported from the base, a fuel tank connected with the member, a needle valve in said member, a nozzle at the end of the member, a burner tube in the groove in the base with its ends bent and resting in the recess, said recess acting as an initial heating means for the tubular member, the bent ends of the burner tube continuing the heating action of said member, an extension on the burner tube arranged to receive the vapor from the nozzle, and a thermometer carried by the base.

In testimony whereof I affix my signature.

GEORGE W. LEWIS.